United States Patent [19]

McCann et al.

[11] Patent Number: 4,591,873

[45] Date of Patent: May 27, 1986

[54] INK JET PRINTING APPARATUS WITH ORIFICE ARRAY CLEANING SYSTEM

[75] Inventors: James D. McCann, Waynesville; Michael J. Piatt, Enon; Theodore F. Williams, Beavercreek, all of Ohio

[73] Assignee: Eastman Kodak Company, Rochester, N.Y.

[21] Appl. No.: 722,494

[22] Filed: Apr. 12, 1985

[51] Int. Cl.[4] ........................ G01D 15/18; B08B 9/00; B01D 21/18

[52] U.S. Cl. ................................ 346/75; 346/140 R; 134/169 R; 210/410; 210/411

[58] Field of Search ............................ 346/75, 140 R; 134/169 R; 210/409, 410, 411

[56] References Cited

U.S. PATENT DOCUMENTS

| | | | |
|---|---|---|---|
| 3,182,670 | 5/1965 | Howell | 134/107 X |
| 4,007,465 | 2/1977 | Chaudharcy | 346/140 R |
| 4,080,608 | 3/1978 | Stoneburner et al. | 346/75 |
| 4,282,105 | 8/1981 | Crowe | 210/798 X |
| 4,296,418 | 10/1981 | Yamazaki et al. | 346/75 |

*Primary Examiner*—E. A. Goldberg
*Assistant Examiner*—Gerald E. Preston
*Attorney, Agent, or Firm*—John D. Husser

[57] ABSTRACT

A cleaning system for ink jet printing orifices includes cooperative elements which provide varying pressure differentials across the orifice plate that oscillate ink into and out of the orifices. In one embodiment the pressure differentials are implemented by varying the impedance to ink cross-flow through a print head cavity while pressurizing a region around the exterior of the orifices.

8 Claims, 3 Drawing Figures

INK JET PRINTING APPARATUS WITH ORIFICE ARRAY CLEANING SYSTEM

BACKGROUND OF THE INVENTION

1. Field of the Invention

The present invention relates to ink jet printing apparatus of the continuous type and more specifically to improved systems (structures and modes) of such apparatus that provide self-cleaning for its jet orifice plate.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream from an orifice plate that is in liquid communication with the cavity. Periodic perturbations are imposed on the liquid stream (e.g. vibrations by an electromechanical transducer) to cause the stream to break up into uniformly sized and shaped droplets. A charge plate is located proximate the stream break-off point to impart electrical charge in accord with a print information signal and charged droplets are deflected from their nominal trajectory. In one common binary printing apparatus charged droplets are deflected into a catcher assembly and non-charged droplets proceed along their nominal trajectory to the print medium.

The components described above (particularly the orifice plate and charge plate) must be precisely sized and positioned to achieve accurate droplet placement on the print medium. However, even after such careful manufacture, significant problems are often presented when the apparatus is shut down for extended periods (e.g. overnight). That is, ink residue which remains from previous usage will often dry in the print head during such shut-down periods. If the dried residue is in the orifice plate it can cause crooked jets. If dried ink residue is in the print head cavity it can become dislodged during printing operation and cause blockage of an orifice or a crooked jet. Dried ink residue in other parts of the circulation system can be filtered; however, excessive quantities of such residue necessitates frequent filter maintenance.

Prior art solutions to the ink residue problems have included (i) purging the ink cavity and orifice plate with air upon shut-down of an operational cycle; and (ii) introduction of cleaning solution at start-up and or shutdown.

These solutions are all helpful but not without related difficulties or disadvantages. For example, purging the ink system with air and/or a cleaning solution adds considerable complexity to the apparatus and requires a lengthy flushing period at start-up.

U.S. application Ser. No. 06,722,551, entitled "Ink Jet Printing Apparatus Having a Wet-Storage System", and filed Apr. 12, 1985, in the name of M. Piatt, discloses a highly useful approach for dealing with the above-noted problems. This approach provides a unique home station into which the station into which the apparatus print head assembly is transported from the operative printing path for wet storage and start-up procedures or for periodic maintenance. The present invention provides further improvements in the approach described in the aforementioned copending application and in particular provides structure and operational modes which effect enhanced cleaning of the ink jet orifices and print head cavity.

SUMMARY OF THE INVENTION

Thus, one general objective of the present invention is to provide improved self-cleaning structure and methods by which ink jet printing apparatus can minimize the printing defects associated with clogged and crooked ink jets. A more particular purpose is to provide improved structure and operational modes by which the ink in such printing apparatus can be utilized to clean the orifice plate and print head cavity of the apparatus. The present invention affords significant advantage, e.g. in avoiding the necessity to remove and manually clean orifice plates or to introduce cleaning fluid or air into the ink system of the apparatus.

The above and other objects and advantages are achieved in accord with one embodiment of the present invention by providing in ink jet printing apparatus of the type having (i) a print head, including an ink cavity, and; (ii) an orifice plate in liquid communication with said ink cavity, the improvement comprising means for producing pressure differentials across said orifice plate that alternately urge ink from the cavity side to the exterior side of the orifice plate and from the exterior side to the cavity side of the orifice plate, whereby extraneous particles are cleaned and dislodged from the Plate's orifices. This sequence is preferably performed in conjunction with a cross-flush procedure where ink flows rapidly through the print head cavity from a head inlet to a head outlet.

In one particularly preferred embodiment of the invention the pressure differentials are produced by enclosing a region around the exterior of said orifice plate, introducing air into the enclosed region and selectively varying the impedance to ink flow through the outlet of said cavity.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
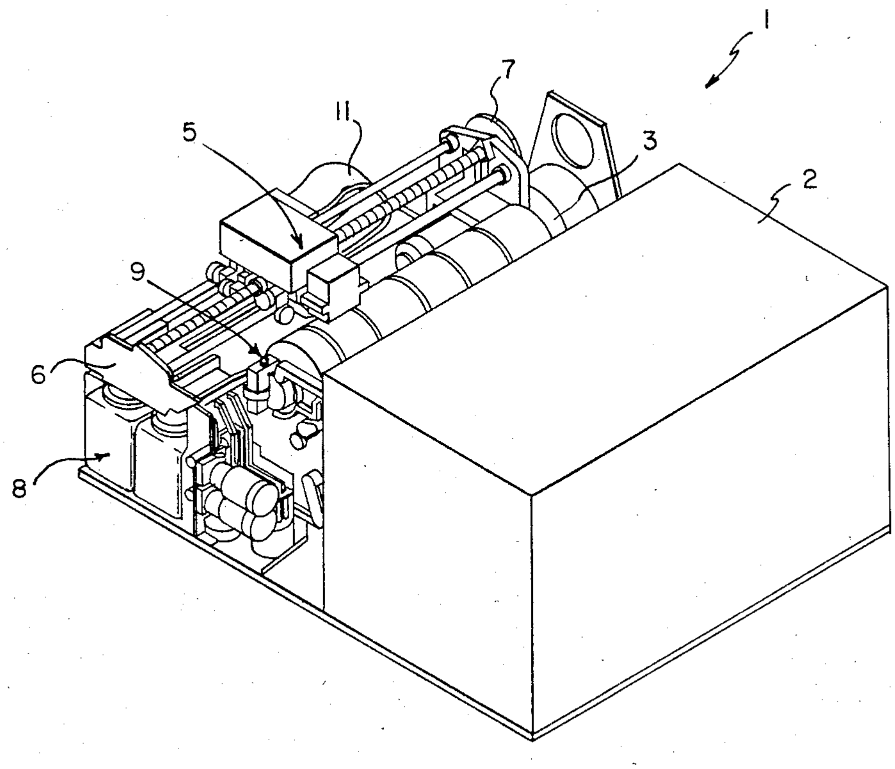
FIG. 1 is a perspective view of one embodiment of ink jet printing apparatus in accord with the present invention.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink cartridge(s) 8. A storage and start-up station 9 is constructed adjacent the left side (as viewed in FIG. 1) of the operative printing path of print head assembly 5 and the drive means 7 and carriage assembly 6 are constructed to transport particular portions of the print head assembly into operative relations with station 9 at appropriate sequences of the operative cycle of apparatus 1, as will be described subsequently.

Figure 2:
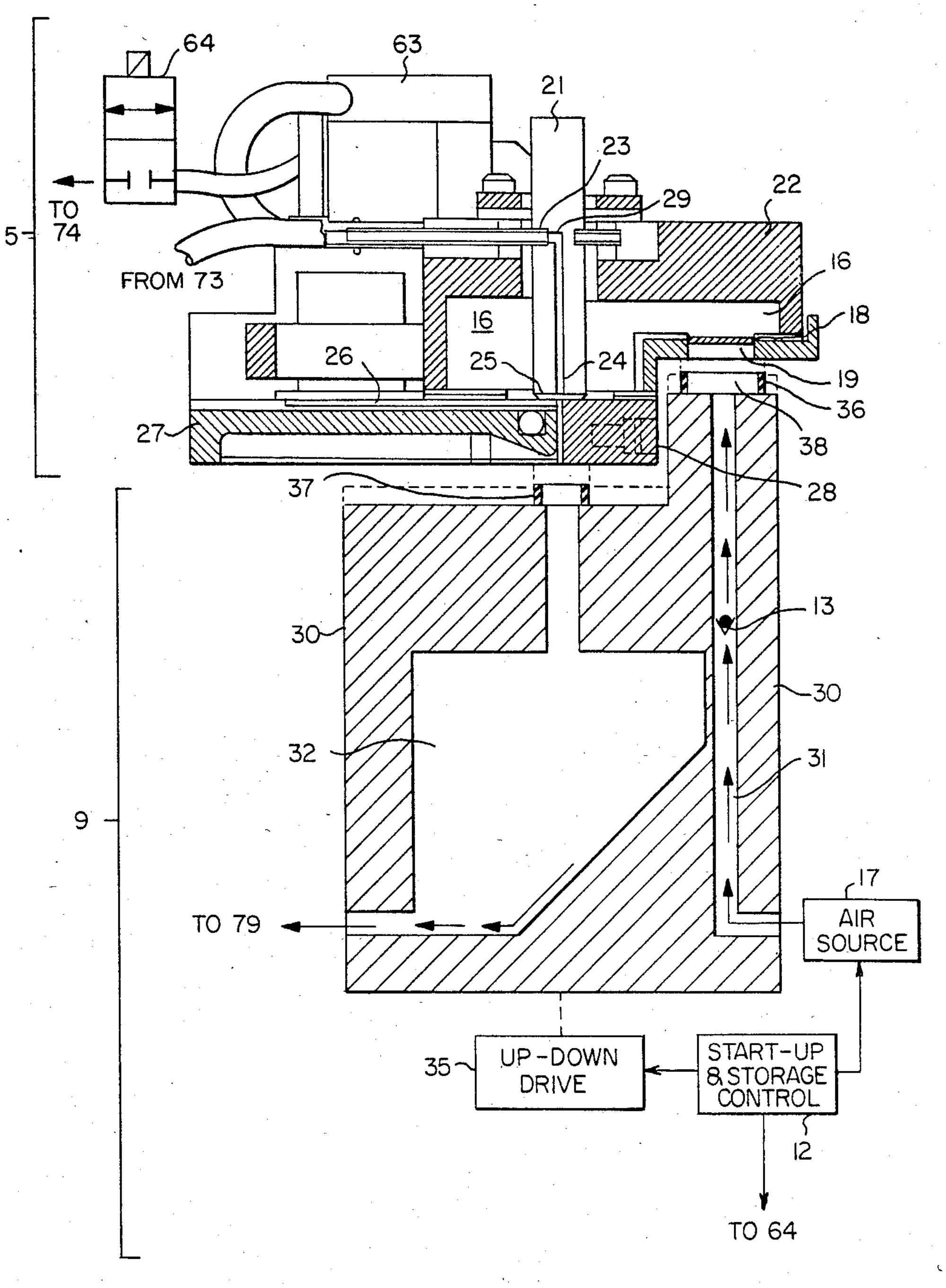
FIG. 2 is a schematic cross-sectional view of a portion of the FIG. 1 apparatus illustrating the upper and lower print head assemblies and their cooperative relation with the storage and start-up station.

Referring briefly to FIG. 2, one embodiment of print head assembly 5 according to the present invention can be seen in more detail. The assembly 5 includes an upper print head portion including a print head body 21 mounted on housing 22 and having an inlet 23 for receiving ink. The body 22 has a passage leading to a print head cavity 24 and an outlet 29 leading from the cavity 24 to the ink circulation system of apparatus 1. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25 to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982, now a continuation-in-part of U.S. application Ser. No. 06/777,102, filed Sept. 17,1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a drop catcher configuration 27 that is constructed and located to catch non-printing droplets (in this arrangement charged droplets). Exemplary preferred charge plate constructions are disclosed in U.S. application Ser. No. 517,608, entitled "Moded Charge Electrode Structure" and filed July 27, 1983, now abandoned, further filed as continuation-in-part of U.S. application Ser. No. 06/696,682 , now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. Finally, in accord with the present invention, lower print head assembly includes a predeterminedly configured and located wall member 28 which will be described in more detail subsequently.

The ink supply and circulation system of the FIG. 1 apparatus includes various ink conduits (i.e. lines) which form supply and circulation paths. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet 29 to a junction between catcher return line 75 and the main ink return line 76. An ink return line 79 also extends from station 9 back to cartridge 8. A flow restrictor 62 is provided in the head supply line 73 and a solenoid valve 64 adapted to provide a selectively variable impedance to liquid ink flow is located in the head return line 74. An air bleed line 78 extends from main filter 61 back to cartridge 8 and an ink bypass line 77 extends from a juncture with line 73 also back to cartridge 8. As will be clear from the subsequent description, the present invention is not limited to use with the particular ink circulation line arrangement illustrated in FIG. 3. Other elements of the FIG. 3 embodiment, such as ink heater 61, final filter 63, temperature sensor 65 and pressure sensor 66 are not necessary for the practice of the present invention, but can be usefully incorporated with it.

Figure 3:
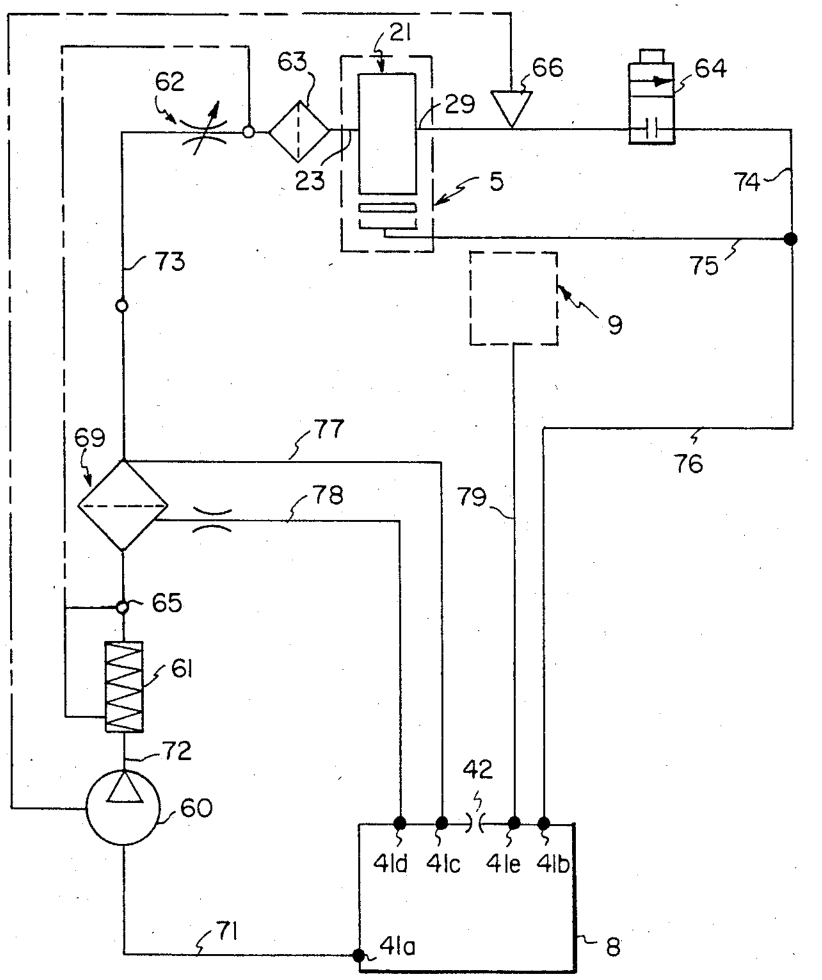
FIG. 3 is a diagrammatic illustration of the ink supply and circulation system of the apparatus shown in FIG. 1.

As shown in FIGS. 1 and 3, cartridge 8 can be in a form that is constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect with lines 71, 76, 77, 78 and 79 upon insertion of the ink cartridge 8 into its mounting in the printer apparatus. Cartridge 8 can have a vent 42 to render the main interior thereof at atmospheric pressure. The cartridge can be constructed with an internal venturi structure which effects return of ink from return line 76 and is disclosed in more detail in concurrently filed U.S. application Ser. No. 06/722,548, entitled "Ink Supply Cartridge and Cooperative Ink Circulation System of Continuous Ink Jet Printer". However, the present invention can function equally well in a circulation system utilizing a separate vacuum pump to withdraw ink from the return lines back to the cartridge.

Referring again to FIG. 2, the storage and start-up station 9 of the present invention comprises a housing 30 having an air supply passage 31 and an ink sump cavity 32 formed therein. The housing 30 is located adjacent the printing path of print head assembly so that the print head assembly can be moved to the cooperative position overlying the housing (as shown in FIG. 2) by the translational drive means 7 (FIG. 1). The housing embodiment shown in FIG. 2 is movable between the dotted-line and solid-line positions (toward and away from the print head assembly), e.g. by up-down drive 35; however, various other arrangements to provide the desired interrelations between the storage and start-up station 9 and print head assembly will occur to one skilled in the art.

As shown in FIG. 2, the housing 30 includes sealing means 36 and 37 which are constructed and located to seal the interface regions of the conduit 31 and sump 32 with the print head assembly from the surrounding atmosphere when the housing is in the upper (dotted-line position). The ink sump 32 is aligned to receive ink issuing from the orifice plate and conduct it to return line 79. The conduit 31 is adapted to interfit with a mating air inlet 18 formed in the print head assembly. The air inlet 18 includes an air filter 19, which is adapted to filter air from a pressure source 17 prior to its passage through opening 16 to the orifice and charge plate region of the print head assembly. A ball valve 13 is biased to a normally closed position in air conduit 31 and is actuated to an open position by the pressure of the air from source 17 when the air source is on.

The structural and functional details of the apparatus thus far described will be further understood by the following description of how it operates in accordance with the present invention, under the control of start-up and storage control 12, which can be, e.g. a portion of a microprocessor system (not shown) that controls the overall operation of apparatus 1. Thus, commencing the operational description in the course of a nominal printing operation sequence, print head assembly 5 is traversing across the print cylinder and ink is flowing in a plurality of stabilized droplet streams from orifice plate 25, past charge plate 26. Charge is imparted to droplets by charge plate 26 in accordance with a printing information signal and non-charged drops pass to the print medium, while charged drops are deflected into catcher 27. At this stage valve 64 is closed and ink is circulating from the catcher 27 back to cartridge 8 as described with respect to FIG. 3.

When it is desired to change apparatus 1 from a printing or standby condition to a storage condition (e.g. for an overnight period) an appropriate command is transmitted to control 12. In response to this command, control 12 signals drive 7 to translate the print head assembly to the position over the storage and start-up station 9 as shown in FIG. 2 (solid lines), with the charge plate operating in a catch-all-drops mode. The up-down drive 35 is next actuated to move housing 30 into the dotted-line position shown in FIG. 2, whereby the space surrounding print head assembly's orifice and charge plates and catcher are sealed from the atmosphere. Next, valve 64 is opened so that ink flows mainly through the cavity outlet and only weeps through orifice plate 25. The ink which does pass through the orifice plate is transported and held by capillary forces in the region defined by the operative surfaces of the charge and orifice plates 26 and 25 and the opposing surface of wall means 28 .The details of structures providing for such capillary ink support are described in the aforementioned application pertaining to that subject. Next the ink supply pump is shut off and it will be appreciated that the operative surfaces of the orifice and charge plate are stored in a wet condition and that the entire fluid system is full of ink rather than air. Also, importantly, the region surrounding operative surfaces of the charge plate orifice plate and catcher are sealed in a high vapor atmosphere so that ink drying is significantly inhibited.

The start-up cycle of apparatus 1, preparatory to recommencing of printing operations, begins with the apparatus in the storage condition just described. Upon receipt of an appropriate start-up command, control 12 actuates pump 60 and heater 61 to circulate and heat ink with valve 64 in an open condition. After the ink has reached proper temperature, valve 64 is closed to an extent that ink is forced through orifice plate 25 in a non-stable condition spraying in all directions and impacting the surfaces of the charge plate 26 and catcher 27. This cleans any dirt that may reside on those surfaces and redissolves any ink which may have dried upon the surfaces.

At this stage of the start-up operations, the cleaning techniques of the present invention can be usefully implemented. To commence these procedures for cleaning the orifices of plate 25 and the adjacent interior portions of cavity 24, the valve 64 is opened to allow the ink to cross-flush through the cavity at a rate that causes only a slight weeping of ink through the orifices of the plate 25 and the air source 17 is actuated to pressurize the sealed region surrounding the print head assembly. Thus with the housing 9 in the dotted-line position control 12 provides air through conduit 31, air filter 19 and opening 16 into the region below the orifice plate's exterior surface. It is preferred that a flow restrictor (not shown) be provided in the return line 79 from sump 32 to facilitate pressure control for the region beneath the orifice plate 25.

In this condition the fluid pressure differential across the orifices of plate 25 is in general equilibrium and can be selectively varied (e.g. by adjustment of the air control and/or valve 64) to alternately urge ink from the exterior side of the orifices to the cavity side of the orifices and from the cavity side to the exterior side. This reversing flow of ink in the orifices has been found highly effective in cleaning the orifices, e.g. lifting particles trapped on the cavity side of the orifice plate into a cross-flush flow and out of the ink cavity. If desired, the air pressure on the exterior side of the charge plate can be sufficiently high to introduce filtered air into the ink cavity 24 through the orifices. The pressure differential also can be such as to allow only ink ingestion back into the cavity. This cycle, i.e. alternate weeping and ingestion of ink can be repeated one or more times to achieve good cleaning of the orifice plate and adjacent cavity interior. The oscillating pressure differential can also be implemented by selectively varying the air pressure, in the enclosed region, above and below the cavity pressure.

The presently preferred mode for implementing the orifice cleaning technique of the present invention is to: (i) establish a cross flow condition(s) where the pressure within the ink cavity 24 is approximately equal to atmospheric pressure (e.g. the pressure at head inlet is approximately +1 psi and the pressure at head outlet is approximately −1 psi), (ii) provide an air pressure in cavity 32 which creates pressure of about 2″ of $H_2O$ on the orifice plate exterior and (iii) then oscillate the solenoid valve 64 about a partially closed position which varies the pressure differential across the orifice plate between approximately ±2″ of water. Restrictor 62 is useful to attain the initial pressure differential between inlet and outlet 23 and 29, however, it also can be oscillated to effect the desired pressure differential variations across the orifice plate 25.

After this sequence, control 12: (i) actuates up-down drive to a lowered position; (ii) raises the pressure ejecting ink from orifice plate 26 to the nominal pressure, e.g. by further closing of valve 64; and (iii) actuates air source 17 to introduce a pressurized, skiving air flow through conduit 31, air filter 19 and opening 16 into the region surrounding the orifice and charge plates. A detailed explanation of preferred structure and procedure for implementing such air flow skiving of the charge plate and catcher surfaces is set forth in concurrently filed U.S. application Ser. No. 06/722,545, entitled "Ink Jet Printing Apparatus Having an Improved Start-Up System".

After the charge plate has been dried by the skiving air flow, the air source 17 is shut off, the transducer is actuated and drop charging commences in a catch-all drops mode. The print head assembly is now in the operating condition in which is was moved into the storage and start-up station and is ready to be moved back along the printing path for printing operation.

The invention has been described in detail with particular reference to preferred embodiments thereof, but it will be understood that variations and modifications can be effected within the spirit and scope of the invention. For example, the sequence of alternating pressure differential across the orifice plate can be implemented at other stages of the overall start-up procedure, during a shut-down procedure or a maintenance procedure intervening printing operations. This concept can be used in combination with other procedures or different structural ink jet apparatus assemblies, to provide the useful reversing ink flow that enhances orifice cleaning. Thus, although the present invention has been described in the context of its employment in continuous ink jet apparatus, those skilled in the art will understand that the concepts of the invention can be utilized in other ink jet systems, e.g. drop-on-demand systems.

What is claimed is:

1. In ink jet printing apparatus of the type having (i) a print head, including an ink cavity and an ink inlet and an ink outlet to said cavity and (ii) an orifice plate in liquid communication with said ink cavity and ink circulating means for supplying ink to said inlet and receiving ink from said outlet, the improvement comprising:

(a) sealing means for enclosing a region around the exterior of said orifice plate;
(b) means for supplying air into said region to establish positive pressure, with respect to the ink cavity pressure, in said region; and
(c) means for selectively varying the pressure of ink in said ink cavity between a positive pressure condition and a negative pressure condition relative to the pressure in said region.

2. The invention defined in claim 1 wherein said pressure-varying means comprises a variable restrictor in said circulation means, downstream from said ink cavity outlet.

3. In ink jet printing apparatus of the type having (i) a print head, including an ink cavity and an ink inlet and an ink outlet to said cavity and (ii) an orifice plate in liquid communication with said ink cavity and ink circulating means for supplying ink to said inlet and receiving ink from said outlet, the improvement comprising means for producing pressure differentials across said orifice plate that alternately urge ink (i) from the cavity side to the exterior side of said orifice plate and (ii) from the exterior side to the cavity side of said orifice plate, whereby extraneous particles are cleaned from the orifice(s) of said plate; said pressure differential producing means including means for enclosing a region around the exterior side of said plate and means for introducing air under positive pressure into said region.

4. The invention defined in claim 3 wherein pressure differential producing means includes means for varying the impedance to ink flow from the outlet of said cavity.

5. The invention defined in claim 4 further including control means for actuating one or more sequences of (i) relatively higher pressure on the cavity side of said plate then (ii) a relatively higher pressure on the exterior side of said plate, followed by (iii) a cross-flush flow of ink through said cavity from said inlet to said outlet.

6. The invention defined in claim 3 further including control means for actuating one or more sequences of (i) relatively higher pressure on the cavity side of said plate then (ii) a relatively higher pressure on the exterior side of said plate, followed by (iii) a cross-flush flow of ink through said cavity from said inlet to said outlet.

7. The invention defined in claim 3 wherein said pressure differential producing means includes means for varying the impedance to ink flow from the outlet of said cavity.

8. In ink jet printing apparatus of the type having a print head, including an ink cavity and an orifice plate in liquid communication with said ink cavity, the improvement comprising means for producing pressure differentials across said orifice plate that alternately urge ink (i) from the cavity side to the exterior side of said orifice plate and (ii) from the exterior side to the cavity side of said orifice plate, whereby extraneous particles are cleaned from the orifice(s) of said plate; said pressure differential producing means including means for enclosing a region around the exterior side of said plate and means for varying the air pressure in said region.

* * * * *